United States Patent [19]
Sorin et al.

[11] Patent Number: 5,610,716
[45] Date of Patent: Mar. 11, 1997

[54] METHOD AND APPARATUS FOR MEASURING FILM THICKNESS UTILIZING THE SLOPE OF THE PHASE OF THE FOURIER TRANSFORM OF AN AUTOCORRELATOR SIGNAL

[75] Inventors: Wayne V. Sorin, Mountain View; Brian L. Heffner, Los Altos; Shalini Venkatesh, Santa Clara, all of Calif.

[73] Assignee: Hewlett-Packard Company, Palo Alto, Calif.

[21] Appl. No.: 520,029

[22] Filed: Aug. 28, 1995

[51] Int. Cl.⁶ .................................................. G01B 9/02
[52] U.S. Cl. ............................................ 356/357; 356/345
[58] Field of Search .................................. 356/345, 357, 356/346

[56] References Cited

U.S. PATENT DOCUMENTS 5,341,205 8/1994 McLandrich et al. ................... 356/357
5,459,570 10/1995 Swanson et al. ....................... 356/345

Primary Examiner—Frank Gonzalez
Assistant Examiner—Robert Kim

[57] ABSTRACT

An apparatus and method for measuring the thickness of a film. The film is illuminated with a low coherence light signal that is preferably generated from a source including two or more LEDs. The light reflected from the surfaces of the film is collected and coupled to an interferometer. The slope of the Fourier transform of the output of the signal from the interferometer is measured to provide a determination of the thickness of the film. In the preferred embodiment of the present invention, the interferometer output is sampled at fewer than two points per cycle of the low coherence light signal.

9 Claims, 5 Drawing Sheets

METHOD AND APPARATUS FOR MEASURING FILM THICKNESS UTILIZING THE SLOPE OF THE PHASE OF THE FOURIER TRANSFORM OF AN AUTOCORRELATOR SIGNAL

FIELD OF THE INVENTION

The present invention relates to optical reflectometry, and more particularly, to an apparatus and method for measuring the thickness of a film, sheet, or web.

BACKGROUND OF THE INVENTION

In many industrial processes, control of film thickness is of critical importance. For example, the manufacture of photographic film requires the generation of a uniform layer of emulsion on a backing. From the point of view of process control, it is advantageous to be able to measure the film thickness during the film generation process rather than measuring the film in a laboratory after the film has been manufactured. If samples are measured off-line, correction of any machinery malfunction cannot be performed until after a considerable volume of defective material has been processed. This leads to waste. For the purposes of the present discussion, the term "film" includes sheets and webs.

Prior art methods for measuring film thickness may be divided into contact and noncontact methods. In one contact method, a micrometer that comes in physical contact with both sides of the film is employed. These methods have the disadvantage of physically deforming the film during the measurement leading to inaccurate measurements and possible damage to the film from pitting or scratching. In addition, the methods are difficult to apply for the on-line measurement of fast moving film webs.

Non-contact methods based on the attenuation of a beam of subatomic particles such as beta particles or gamma rays are also known to the prior art. For example, the attenuation of a beam of electrons by the film is used to determine the film thickness in one prior art method of this type. This methodology has three disadvantages. First, the system must be calibrated for each type of film, since the attenuation depends on the chemical composition and density of the film. Second, the system typically relies on a radioactive source to generate the particle beam. It is generally desirable to limit the use of radioactive material for cost, safety, and psychological reasons. Third, access is normally required to both sides of the film so that the source can be placed on one side and the detector on the other.

Methods for measuring the thickness of films using an optical autocorrelator are also known to prior art. For the purposes of this discussion, an optical autocorrelator is defined to be an interferometer having a variable differential time delay. A Michelson interferometer is an example of such an autocorrelator. For example, U.S. Pat. No. 3,319,515 to Flournoy describes the use of a Michelson interferometer for measuring the thickness of a film. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input.

The application of this type of autocorrelation technology to the measurement of very thin films has a number of problems. The output of the interferometer is a sinusoidal fringe pattern modulated by an envelope function which exhibits a number of peaks. To accurately measure the thickness of very thin films, the center of each peak must be determined to a high degree of accuracy. In prior art systems, the output of the interferometer is sampled at a rate specified by the Nyquist criterion which results in at least two samples being taken per cycle of the underlying sine wave. In systems requiring fast processing, the resulting number of data points places a significant computational load on the system. To accommodate this load, more expensive computational engines must be used which increases the cost of the measurement system.

The accuracy with which the difference in the peak centers can be determined also depends on the spectral width of the low coherence light source used to illuminate the film. As will be explained in more detail below, broader width sources provide a more accurate determination of the difference. Prior art interferometric film measuring systems use either a white light source or a light emitting diode (LED). While the white light source provides the necessary spectral width, the intensity of light that can be coupled to the film is too low to provide adequate signal to noise ratios in many applications. While an LED source can provide higher power, the spectral line width of the source is too narrow to provide optimum resolution.

Broadly, it is the object of the present invention to provide an improved apparatus and method for measuring the thickness of a thin film.

It is a further object of the present invention to provide a system that does not require contact between the film and the measuring device.

It is a still further object of the present invention to provide a system accurately determine the film thickness without requiring a sampling rate that requires two or more samples per period of the underlying sine wave.

It is yet another object of the present invention to provide a system which achieves the benefits obtainable with wide spectral width light sources while coupling a higher light intensity to the film under measurement than may be coupled using a white light source.

These and other objects of the present invention will become apparent to those skilled in the art from the following detailed description of the invention and the accompanying drawings.

SUMMARY OF THE INVENTION

The present invention is an apparatus and method for measuring the thickness of a film. The film is illuminated with a low coherence light signal that is preferably generated from a source comprising two or more LEDs. The light reflected from the surfaces of the film is collected and coupled to an interferometer. The slope of the Fourier transform of a portion of the output of the signal from the interferometer is used to determine the thickness of the film. In the preferred embodiment of the present invention, the interferometer output is sampled at fewer than two points per cycle of the low coherence light signal.

DETAILED DESCRIPTION OF THE INVENTION

Figure 1:
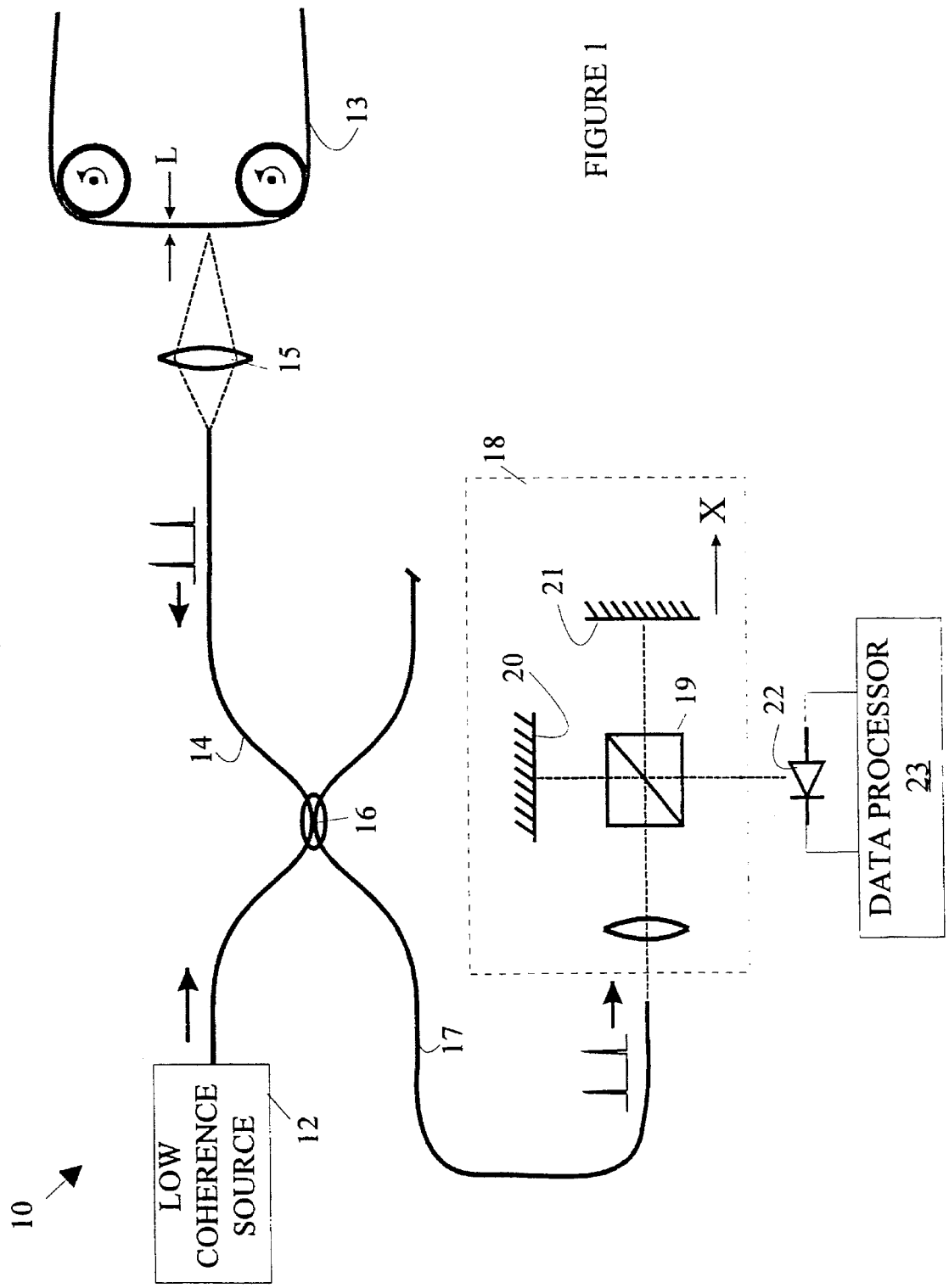
FIG. 1 is a block diagram of an apparatus according to the present invention for measuring the thickness of a film.
Figure 2:
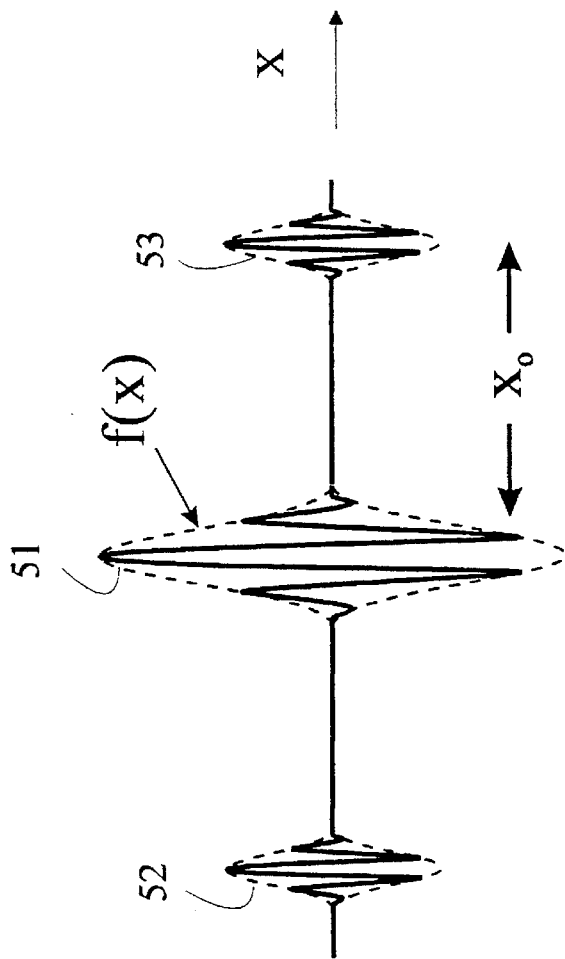
FIG. 2 illustrates the signal generated by the Michelson interferometer shown in FIG. 1.

The present invention may be more easily understood with reference to FIGS. 1 and 2 which illustrate the measurement of the thickness of a film 13 moving past an apparatus 10 according to the present invention. Apparatus 10 illuminates film 13 with a low coherence light generated by source 12 which is preferably a superluminescent diode or LED. For the purposes of this discussion, a low coherence light source is defined to be a source having a functional spectral width graer than 0.1% of its center frequency. The light is delivered to film 13 via optical fiber 14 and lens 15. Lens 15 focuses the light onto film 13 and collects a portion of the reflected light which is coupled back into fiber 14. A portion of the collected light is delivered to an autocorrelator 18 via coupler 16 and fiber 17. Optical couplers for use with fiber optics are well known to the art, and hence, will not be discussed in more detail here.

The light signal delivered to autocorrelator 18 includes two light signals which result from the refection of the light incident on film 13 at the two surfaces of film 13. If film 13 has a group index equal to $\eta$ and a thickness of L, the two light signals will be separated in time by 2 $\eta L/c$, where c is the speed of light. The light incident on the autocorrelator is split into two beams that traverse different paths by beam splitter 19. The first path is determined by the position of fixed mirror 20 and the second by moveable mirror 21. After traversing the different paths, the light is recombined by splitter 19 and directed to a photodiode 22 which measures the intensity of the light. The light intensity measurements are processed as described below.

The intensity of the light as a function of the position, X, of mirror 21 is shown in FIG. 2. This intensity function has three "packets" or "bursts" of interference fringes as shown at 51–53. The large packet 51 corresponds to X=0. This packet results when the optical paths are equal in length, and hence, the light from each of the reflections coherently interferes with itself. The two smaller peaks result from the cases in which the paths differ by the optical distance between the two surfaces of the film being measured. These packets result from the cross interference between the reflections generated at the two surfaces of the film being measured. These packets are positioned at X values equal to the optical path between the two surfaces of the film, i.e., $X_0=\eta L$. Hence, the problem of measuring the film thickness is reduced to determining the distance between two packets in the output of the interferometer.

In the preferred embodiment of the present invention, a reference laser is used to provide a calibration of X. The light from the reference laser is mixed with the light entering the autocorrelator. The reference laser has a wavelength that is sufficiently different from that of the light source used to generate the signals that are applied to the film that the interference fringes from the reference laser may be differentiated by a color filter. The reference fringes are used to trigger the sampling of the output from photodiode 22. Such an arrangement is shown in a copending application (U.S. Ser. No. 08/304,247) which is hereby incorporated by reference.

Figure 3:
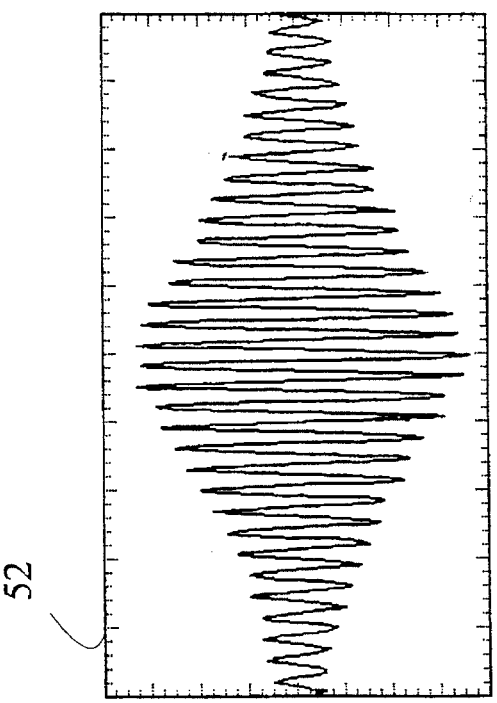
FIG. 3 is an expanded view of one of the packets shown in FIG. 1.

Unfortunately, the number of interference fringes in a packet can be quite large as shown in FIG. 3 which is an expanded view of a typical packet. The distance between the individual fringes corresponds to the wavelength of the light generated by light source 12. The width of the packet is determined by the coherence length of the light generated by light source 12 which can be an order of magnitude or more larger than the wavelength. Hence, the accuracy of measurement for films having thicknesses of the order of 10 to 100 μm is limited by the accuracy with which the distance between the centers of two packets can be determined.

One method for determining the center of a similar type of packet utilizes the phase of the Fourier transform of the packet intensity. For example, Danielson, et al. (Applied Optics, Vol 30, No. 21, pp. 2975–2979) show that the center of a packet obtained from the output of a conventional interferometer can be determined from the Fourier transform of the interferometer output. Consider a packet having a center displaced from the x-origin by $\Delta x$. Then it can be shown that the phase of the Fourier transform of the packet has a slope that equal to $-2\pi\Delta x$. This observation may be used to refine an estimate of the center of a packet.

Figure 4:
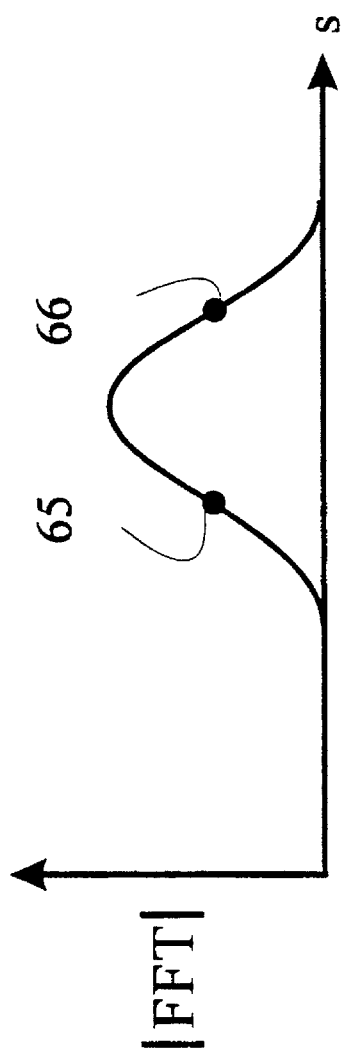
FIG. 4 is a graph of the absolute value of the Fourier transform of one of the peaks in the output of the interferometer shown in FIG. 1 as a function of frequency when an LED is used as the light source.
Figure 5:
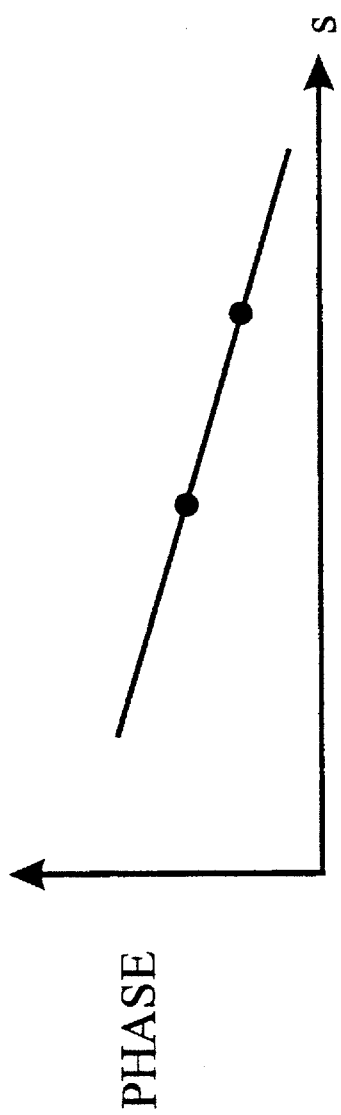
FIG. 5 is a graph of the phase of the of the Fourier transform of one of the peaks in the output of the interferometer shown in FIG. 1 as a function of frequency when an LED is used as the light source.

Consider packet 53 shown in FIG. 2. The Fourier transform of this packet is shown in FIGS. 4 and 5. FIG. 4 is a plot of the magnitude of the Fourier transform in the frequency domain, and FIG. 5 is a plot of the phase of the Fourier transform as a function of frequency. By measuring the slope of the phase, the displacement, $X_0$ from the origin may be determined. The foregoing analysis assumes that the center of the large packet at x=0 is known with sufficient accuracy. However, this is not a necessary condition. If the center of the packet at the origin in the spatial domain is not accurately known, the process can be repeated on that packet to determine its position relative to the assumed origin. The distance between two packets can then be determined by subtracting the positions obtained in the analysis of each of the packets.

The above described system assumes that the phase of the Fourier transform of the interferometer output may be determined with sufficient accuracy. The theory underlying the above scheme assumes that any noise is small compared to the Fourier transform of the packet. Hence, the points used to measure the slope in the frequency domain must correspond to regions of the spectrum in which the magnitude of the Fourier transform is large compared to any noise. Exemplary points are shown in FIG. 4 at 65 and 66.

In general, the accuracy with which the slope of the phase line can be determined is a function of the signal to noise ratio of the phase signal and of the distance between points 65 and 66. Points with greater separation will, in general, provide higher accuracy than points that are more closely spaced in the frequency domain. However, the maximum distance between the points is determined by the width of the magnitude of the Fourier spectrum, since points outside this region correspond to spectral regions having poor signal to noise ratios. While the determination of the slope can be improved somewhat by measuring the phase at a number of points between points 65 and 66, for any particular set of points between points 65 and 66, the accuracy will improve if the distance between points 65 and 66 can be increased.

The width of the Fourier magnitude spectrum is determined by the spectral width of light source 12. Hence, increasing the spectral width of the output of the light source will, in principle, increase the accuracy with which the slope can be determined. The broadest source would be a white light source; however, such sources have relatively low intensities. As noted above, it is also important to have a signal that is large compared to the noise levels. In many applications, the intensities obtainable from a conventional incandescent source are too low to provide the needed signal to noise ratios.

Figure 6:
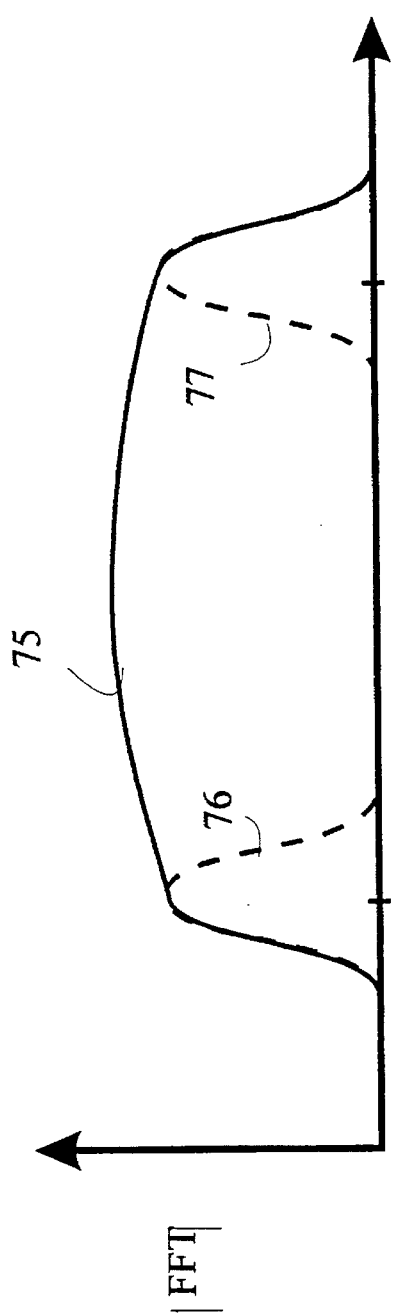
FIG. 6 is a graph of the absolute value of the Fourier transform of one of the peaks in the output of the interferometer shown in FIG. 1 as a function of frequency when a pair of LEDs are used as the light source.
Figure 7:
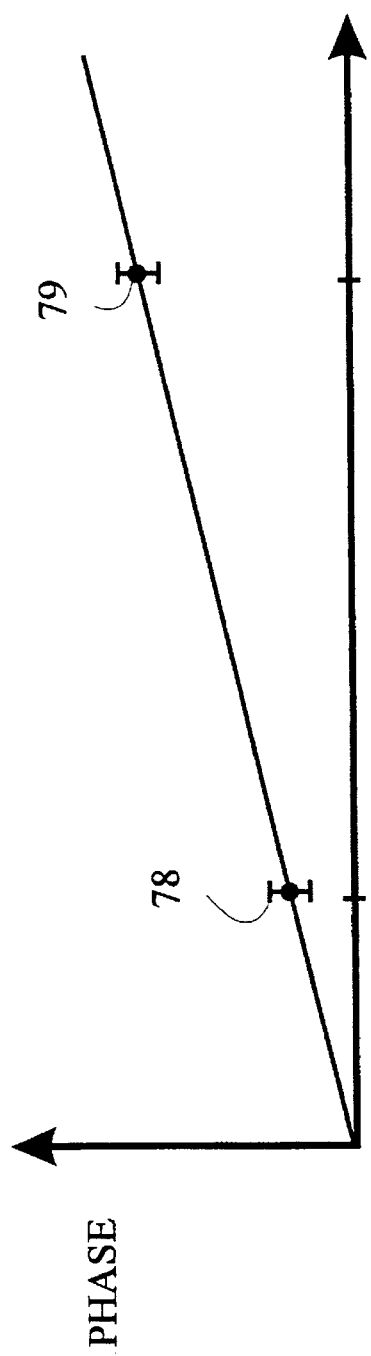
FIG. 7 is a graph of the phase of the of the Fourier transform of one of the peaks in the output of the interferometer shown in FIG. 1 as a function of frequency when a pair of LEDs are used as the light source.

In the preferred embodiment of the present invention, this intensity problem is overcome by using a source comprising two sources that are separated in frequency. For example, the light from a red and a green LED may be combined. This compound source is used in place of the single LED source discussed above with reference to FIG. 1. Refer now to FIG. 6 which is a comparison of the spectrum of such a source and that of a conventional white light source shown at 75. The individual LED spectra are shown at 76 and 77. The phase measurements needed to determine the slope of the phase line may be made at the peak spectral intensities of the two sources as shown in FIG. 7. The separation of the points can be made nearly the same as the separation obtainable with a white light while maintaining the higher output power of the LEDs. In this regard, it should be noted that the white light curve shown in FIG. 6 is not drawn to scale relative to the LED spectral curves.

Figure 8:
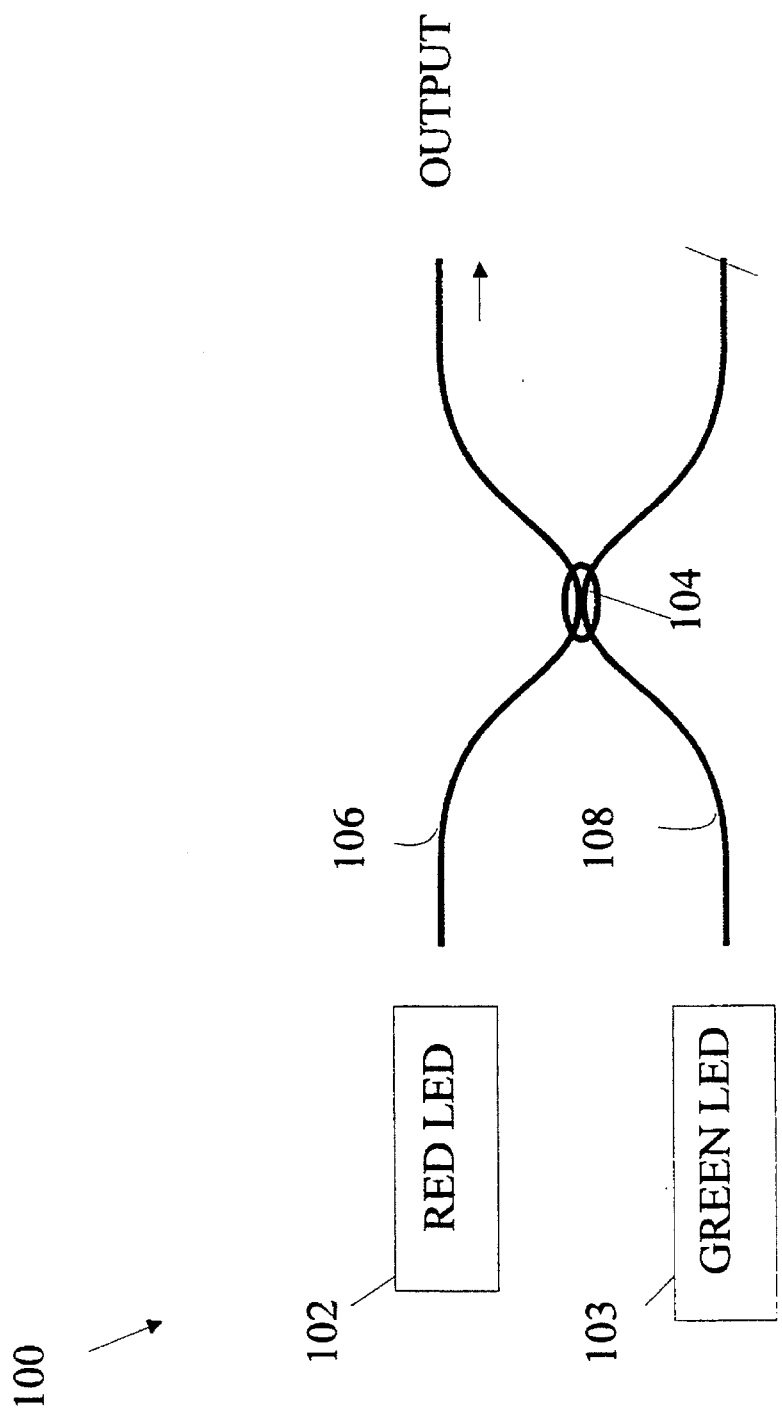
FIG. 8 is a block diagram of a compound light source based on two LEDs.

The compound light source discussed above may be constructed from two LED sources and a wavelength multiplexing coupler. Such an arrangement is shown in FIG. 8 at 100. The red LED source 102 is imaged into the end of a first optical fiber 106, and the green LED source 104 is imaged into the end of a second optical fiber 108. The two optical fibers are joined by a coupler 104. The light from one branch of the coupler provides the desired compound light source.

The above described embodiments of the present invention require that the packets from the interferometer be sampled at a sufficient number of points to provide an accurate determination of the phase slope. If the wave form is sampled using the Nyquist criterion as typically used in prior art systems using the phase slope measurement technique, then the number of points can be quite large. This criterion requires that approximately two points be measured for each cycle of the sine wave. The computational workload inherent in the Fourier transform of the measurements is of order NlogN, where N is number of samples in each packet. Hence, it is advantageous to reduce the number of samples. A large number of samples can limit the speed with measurements can be made and/or significantly increase the cost the computational engine that must be included with each instrument.

The preferred embodiment of the present invention avoids this high computational workload by making use of the observation that the input wave form may be viewed as a constant frequency sinusoidal carrier that is modulated by the packet envelope. This reduces the effective frequency that must be sampled to that of the packet envelope instead of the high frequency of the underlying carrier. As a result, the present invention can obtain accurate displacement measurements using a small number of samples across the packet envelope.

While the above described embodiments of the present invention have utilized an optical autocorrelator constructed from an interferometer, it should be noted that the same output can be obtained by taking the Fourier transform of the output of an optical spectrum analyzer. An optical spectrum analyzer does not require any moving parts, and hence, has advantages in some applications.

Various modifications to the present invention will become apparent to those skilled in the art from the foregoing description and accompanying drawings. Accordingly, the present invention is to be limited solely by the scope of the following claims.

What is claimed is:

1. An apparatus for measuring the thickness of a film, said apparatus comprising:

low coherence source for generating a light signal, said light signal having a functional spectral width greater than 0.1% of its center frequency;

coupling means for directing said light signal at said film and for collecting light reflected from said film to generate a collected light signal;

means for coupling said collected light signal to an interferometer to generate an interference light signal; and processing means for determining the slope of the phase of the Fourier transform of said interference light signal as a function of frequency.

2. The apparatus of claim 1 wherein said interferometer is an autocorrelator.

3. The apparatus of claim 1 wherein said low coherence source comprises first and second light sources, each said light source emitting light in a different region of the optical spectrum.

4. The apparatus of claim 1 wherein said processing means samples the intensity of said interference light signal with less than two samples per cycle of said input light frequency.

5. The apparatus of claim 1 wherein said interferometer comprises an optical spectrum analyzer having an output comprising a signal representing the amplitude of said collected light signal as a function of frequency and means for generating the Fourier transform of said output.

6. A method for measuring the thickness of a film, said method comprising the steps of:

illuminating said film with a light signal from a low coherence source, for generating a light signal, said light signal having a functional spectral width greater than 0.1% of its center frequency;

collecting light reflected from said film to generate a collected light signal;

coupling said collected light signal to an interferometer to generate an interference light signal; and determining the slope of the phase of the Fourier transform of said interference light signal as a function of frequency.

7. The method of claim 6 wherein said interferometer is an autocorrelator.

8. The method of claim 6 wherein said low coherence source comprises first and second light sources, each said light source emitting light in a different region of the optical spectrum.

9. The method of claim 6 wherein said step of determining the slope comprises sampling the intensity of said interference light signal with less than two samples per cycle of said input light frequency.

* * * * *